US006246922B1

(12) United States Patent
Korman et al.

(10) Patent No.: US 6,246,922 B1
(45) **Date of Patent: *Jun. 12, 2001**

(54) AUTOMATIC COMPUTER CONTROLLED PROGRAMMABLE MULTI-PURPOSE APPARATUS TO PRODUCE VARIABLE DESIGN STAMPINGS

(75) Inventors: Roger Korman, Taylor; George Ziehm, Shelby Twp.; Philip Rushman, Trenton, all of MI (US)

(73) Assignee: Hydro-Cam Engineering Company, Troy, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,632

(22) Filed: Apr. 17, 1998

(51) Int. Cl.[7] .......... G06F 19/00

(52) U.S. Cl. .......... 700/206; 700/130; 700/143; 702/33; 702/441

(58) Field of Search .......... 700/206, 130, 700/143, 42; 702/33, 42; 72/21.3, 441; 264/40.1, 40.5; 425/149, 78, 353–354

(56) References Cited

U.S. PATENT DOCUMENTS 3,727,442 4/1973 Ridgway et al. .
3,949,589 4/1976 Johnson et al. .
4,347,727 * 9/1982 Galiger .......... 72/389.4
4,510,570 * 4/1985 Yonekura .......... 364/476.01
4,744,036 * 5/1988 Tiggelen .......... 364/476.01
4,983,893 * 1/1991 Miyashita et al. .......... 318/135
5,211,964 * 5/1993 Prytherch et al. .......... 425/140
5,243,902 9/1993 Plazenet .
5,354,168 * 10/1994 Allison et al. .......... 414/676
5,450,756 * 9/1995 Kirii et al. .......... 73/825
5,467,285 11/1995 Flinn et al. .
5,517,910 5/1996 Skahan .
5,656,903 * 8/1997 Shui et al. .......... 318/568.1
5,868,020 * 2/1999 Delaney et al. .......... 72/21.3
5,893,047 * 4/1999 Gimblett et al. .......... 702/33

* cited by examiner

*Primary Examiner*—Ayaz Sheikh
*Assistant Examiner*—Firmin Backer
(74) *Attorney, Agent, or Firm*—Dinnin & Dunn, P.C.

(57) ABSTRACT

A computer controlled die system which includes a plurality of sub-dies, and an input system. The die system also includes a motion system, and an air driven cam system. Furthermore, the die system includes a clamping system and an airlift system. The entire computer controlled die system is automatic. No manual adjustments have to be made in between different stampings for various parts in a manufacturing setting. Additional subsystems may be added to meet criteria of part.

23 Claims, 7 Drawing Sheets

AUTOMATIC COMPUTER CONTROLLED PROGRAMMABLE MULTI-PURPOSE APPARATUS TO PRODUCE VARIABLE DESIGN STAMPINGS

BACKGROUND OF THE INVENTION

1. Field of the Invention

The present invention relates generally to stamping processes and presses and in particular to a computer controlled programmable stamping apparatus.

2. Description of Related Art

Stamping presses for use in cutting, blanking and shaping sheet metal stock have been known for many years. The prior art presses at best would be semi-automatic in operation. However, when changing from one work piece to another the die sets would have to be manually changed in the press whenever a new type of work piece was to be produced. Therefore, whenever a small number of work pieces were to be created during a run the time and labor needed to change the setup of the press manually is substantial. Furthermore, the changing and setup of the press creates lost press time which is valuable to a manufacturing company. Therefore, all of the prior art presses had a manual set of steps necessary in order to change over to a new type of work piece so that a different run can occur.

Therefore, there is a need in the art for a completely automatic die that does not need manual adjustments in between different runs of work pieces. There is also a need for a computer controlled die such that a computer controls most pertinent functions in creating the different die positions and cam punch positions for each new work piece.

SUMMARY OF THE INVENTION

One object of the present invention is to provide a computer controlled die in a press stamping apparatus.

Another object of the present invention is to provide a computer controlled master die which has a plurality of movable sub-dies.

Yet another object of the present invention is to provide an automatic computer controlled master die that requires less down time and manual adjustments in between runs of various parts.

Yet another object of the present invention is to reduce manufacturing costs by use of a fully automatic computer controlled master die.

To achieve the foregoing objects an automatic computer controlled programmable apparatus to produce variable design stampings is used. The automatic computer controlled apparatus includes an input system, a plurality of sub-dies and a motion system. The computer controlled die system further includes a proximity switch system, an air driven cam system, a clamping system and an airlift system. All of the above systems are interconnected via cables to a programmable computer system.

One advantage of the present invention is that it provides a completely automatic computer controlled die and stamping apparatus.

Another advantage of the present invention is that it provides a stamping apparatus that does not have to be manually adjusted between runs of various parts.

Still another advantage of the present invention is that it provides a computer controlled master die that includes a plurality of movable sub-dies.

Yet another advantage of the present invention is that it reduces manufacturing costs by reducing down time of the press between various part runs.

Other objects, features and advantages of the present invention will become apparent from the subsequent description and appended claims, taken in conjunction with the accompanying drawings.

BRIEF DESCRIPTION OF THE DRAWINGS

FIG. 5 shows a top view of the present invention.

FIG. 8 shows a plan view of the die.

Figure 1:
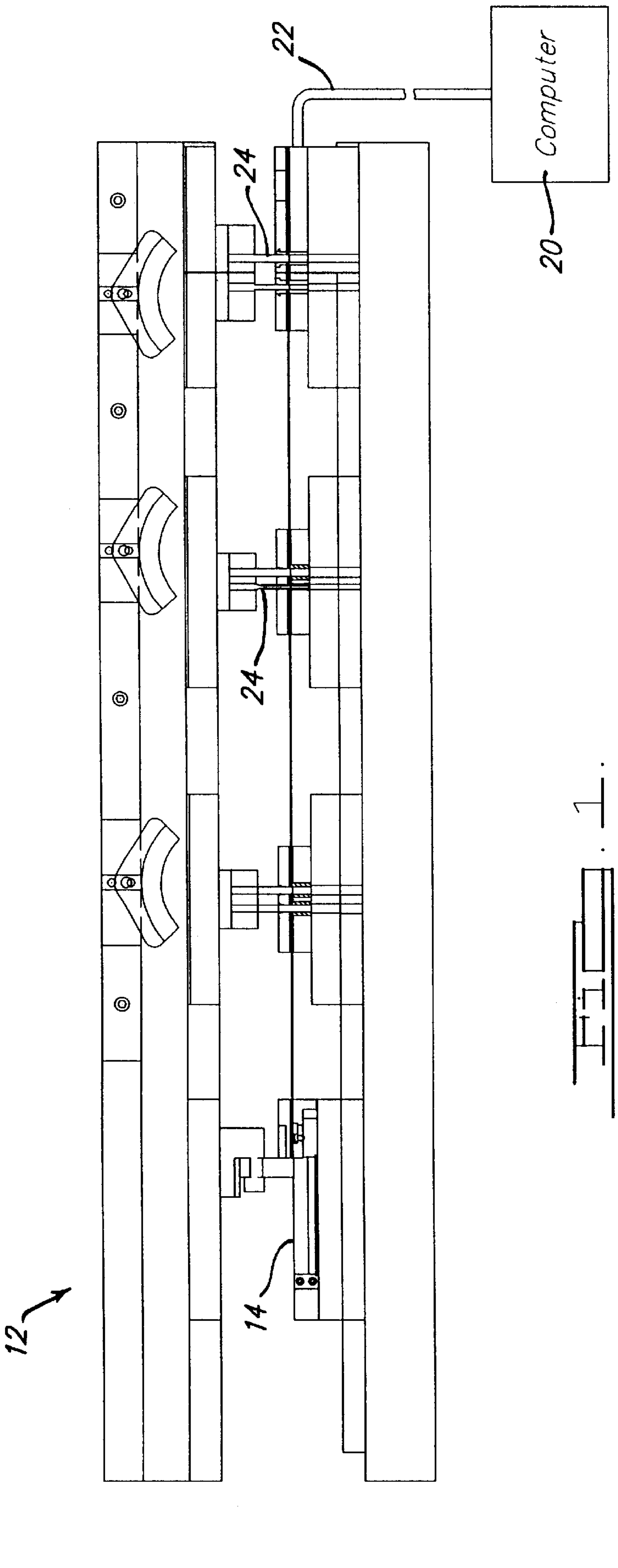
FIG. 1 shows a side view of the present invention.
Figure 2:
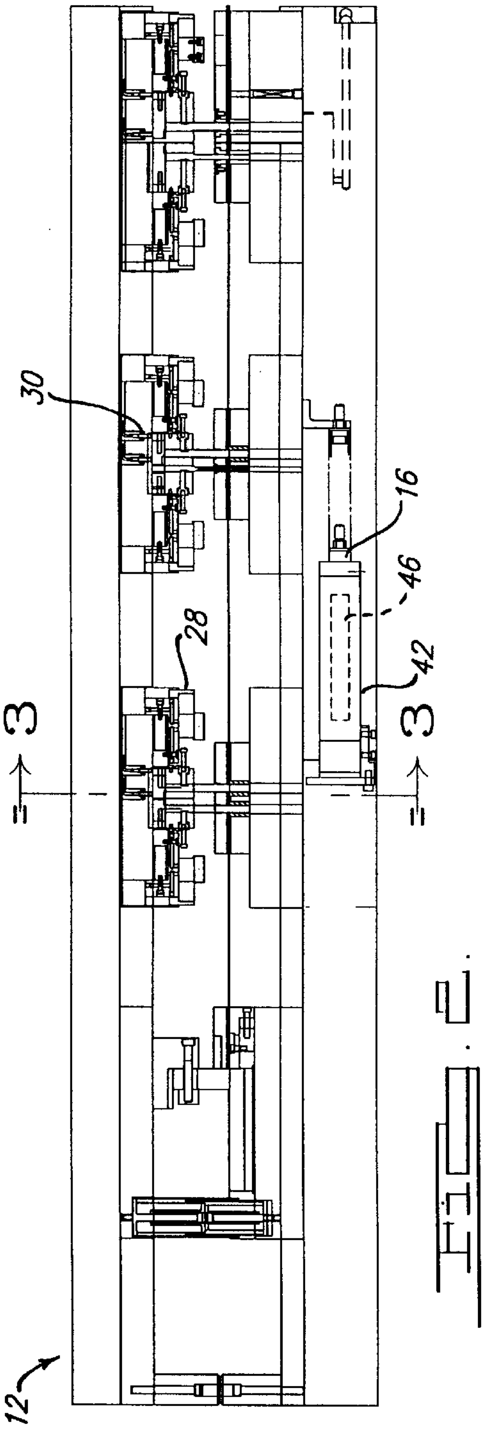
FIG. 2 shows a lengthwise section view of the present invention.
Figure 4:
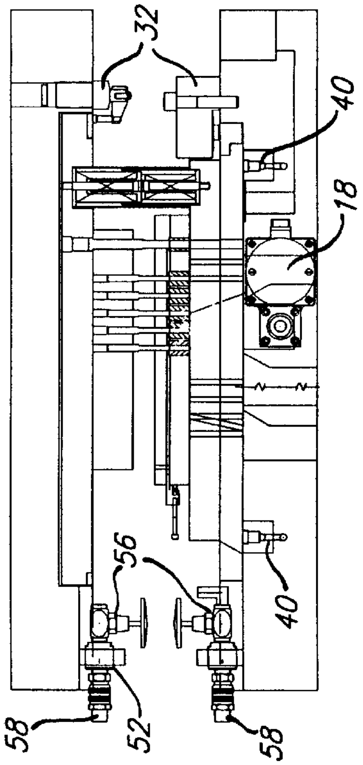
FIG. 4 shows a partial cross section of the present invention.
Figure 3:
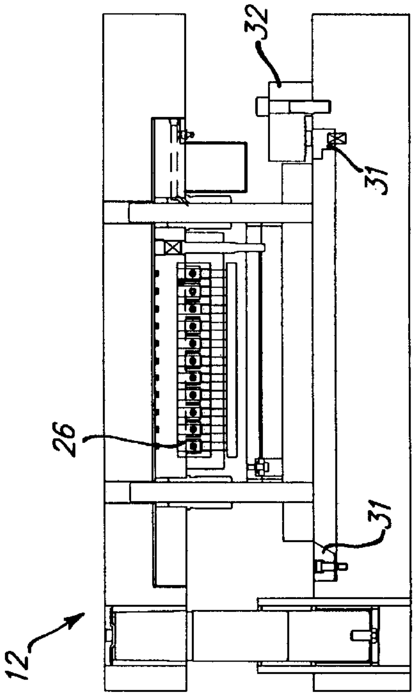
FIG. 3 shows a cross section thru a sub die of the present invention.
Figure 3:
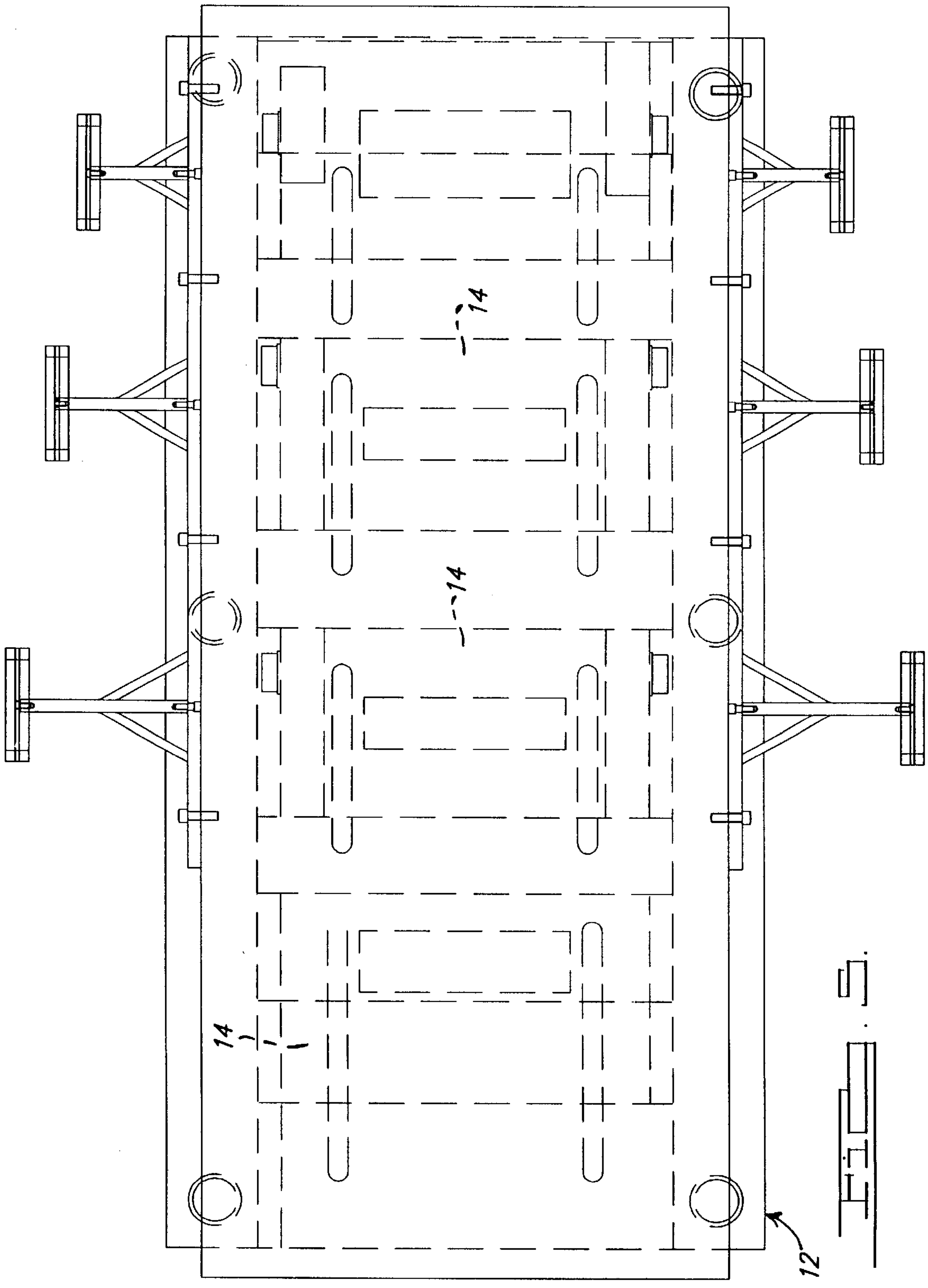
Figure 4:
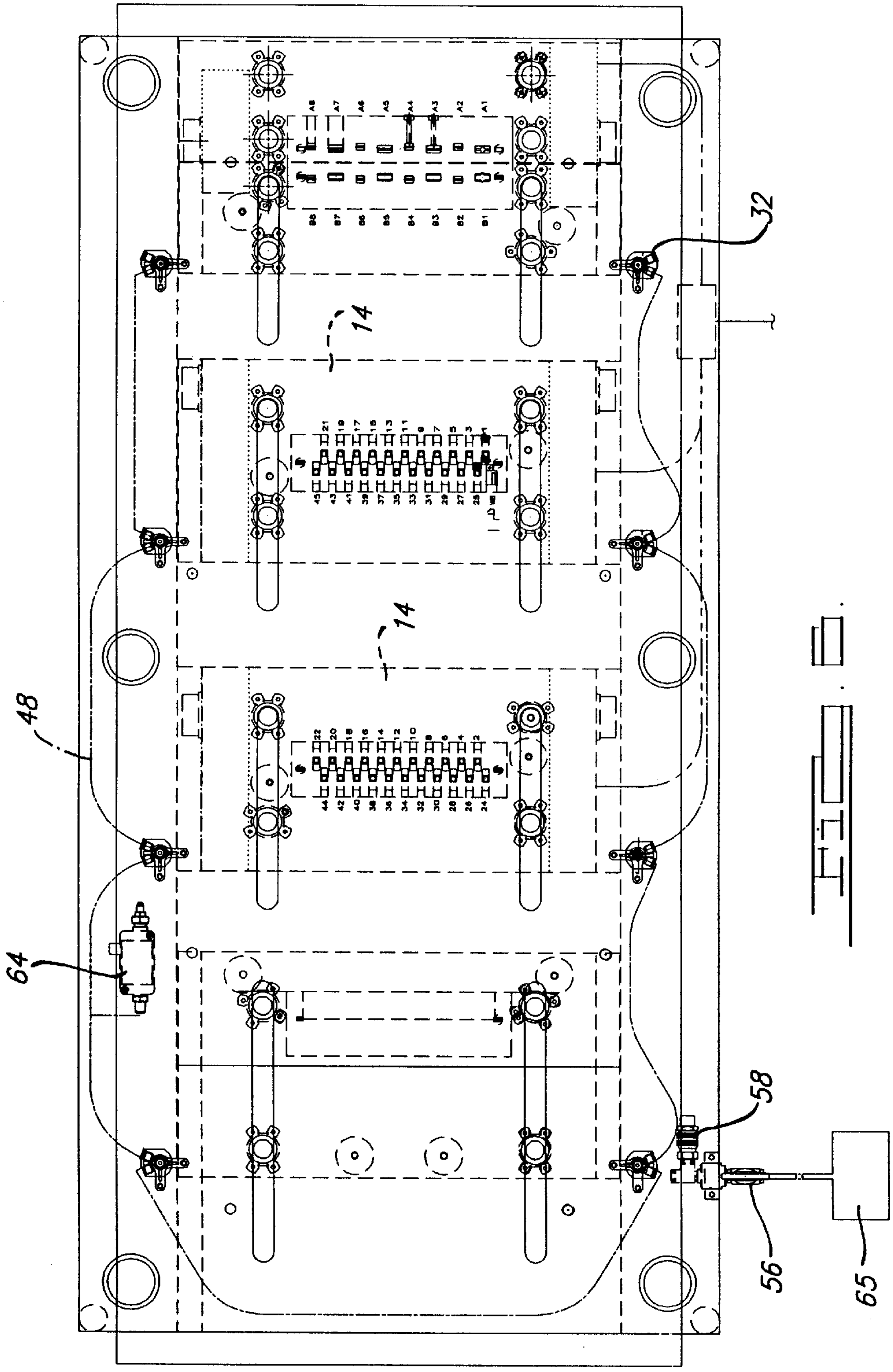
Figure 7:
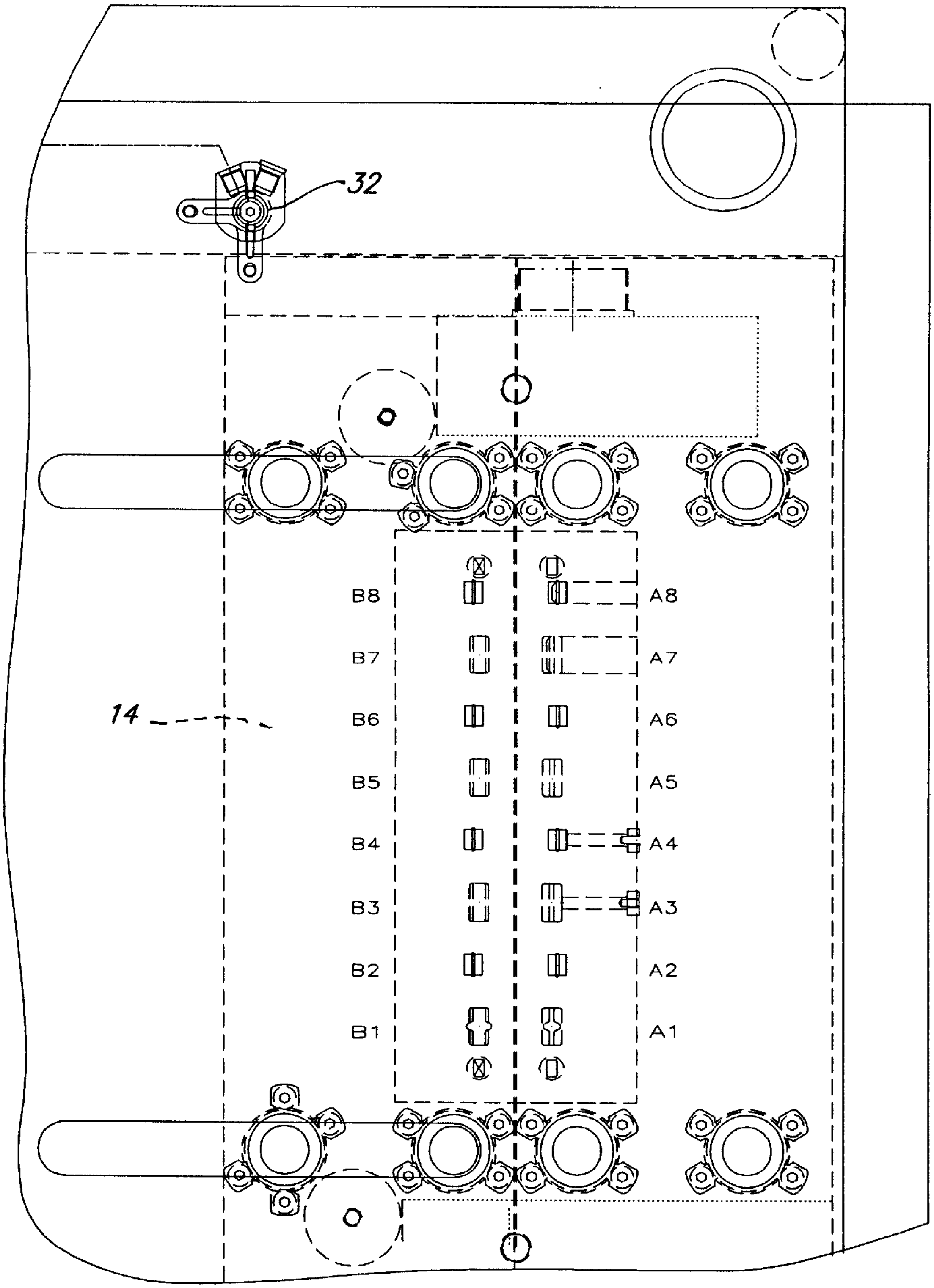
FIG. 7 shows an enlarged section of FIG. 6.
Figure 6:
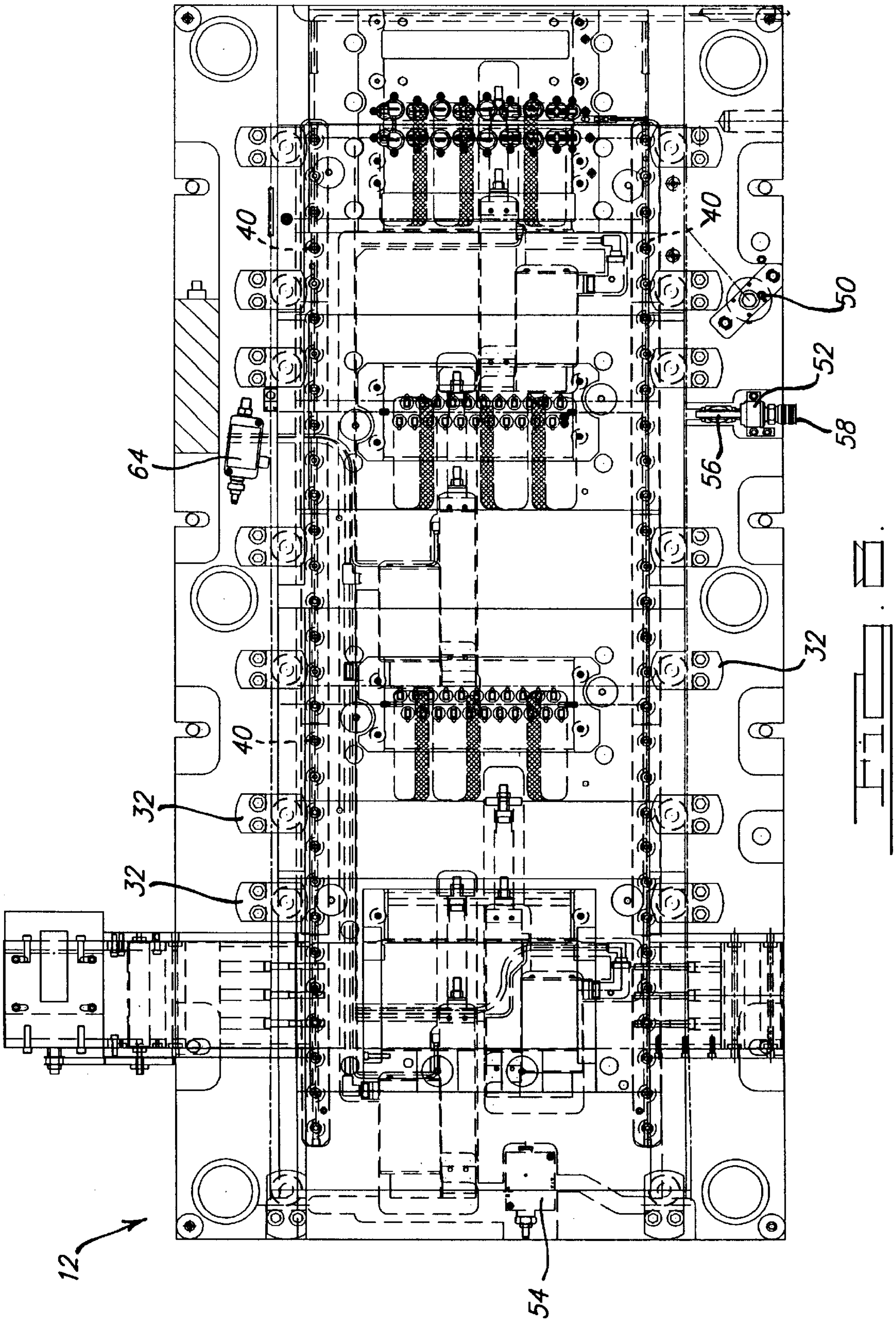
FIG. 6 shows the movable dies and cams from the top.
Figure 9:
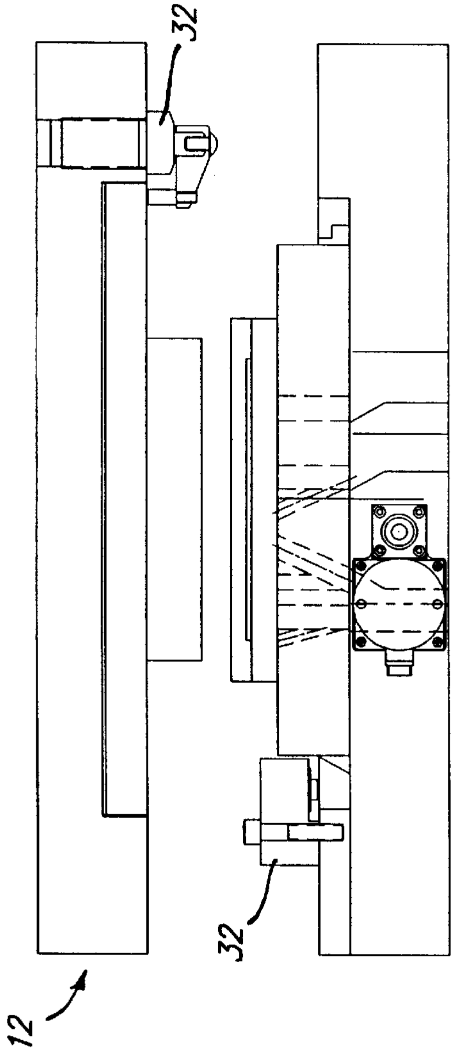
FIG. 9 shows an end view of the present invention.
Figure 10:
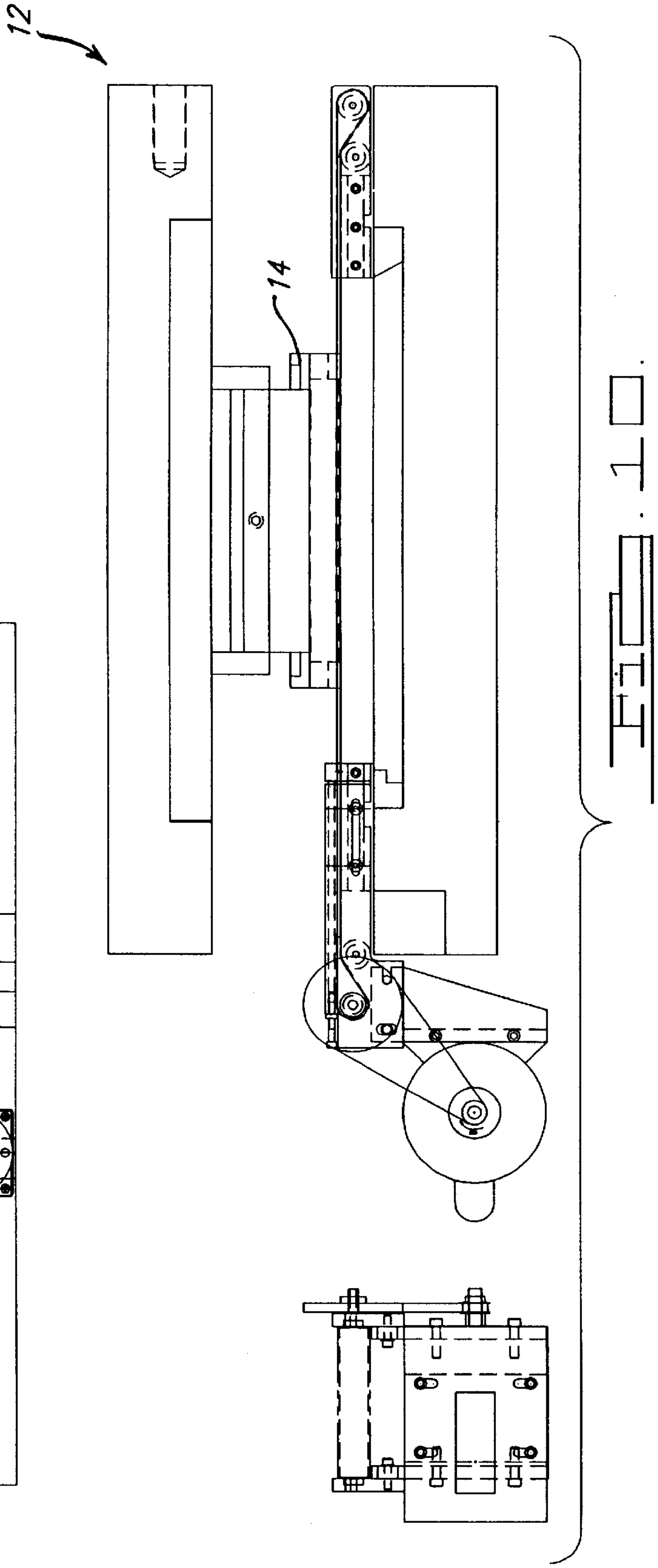
FIG. 10 shows the present invention with integral conveyor for part ejection.

BEST MODE OF CARRYING OUT THE INVENTION AND DESCRIPTION OF THE PREFERRED EMBODIMENT(S)

Referring to the drawings, a computer controlled die system 12 according to the present invention is shown. The computer controlled die system 12 will provide a means of changing the progression or pitch of the subdies 14 to produce a family of parts that vary in a linear manner. The subdies 14 can also change the internal configuration of the parts by the use of various systems such as cammed punches 24 for piercing or forming and the use of interchangeable components.

The computer controlled progressive die system 12 includes a plurality of subdies 14 that are movable to various locations such that the length of the part (progression) may be changed from a preferable range having a minimum of 1.5 inches to a maximum of 6.007 inches or to suit the design of the part. However, it should be noted that any range can be provided depending on the needs of the parts to be produced using the press and die unit. Each of the sub-dies 14 is controlled and moved by a ball screw cylinder 16 and a stepper motor 18 which is controlled by a computer 20. It should also be noted that the subdie motion system could also employ the use of stepper or servo motors, ball screw actuators, linear motors, gear drives, timing belt drives, rack and pinion gear units, air cylinders, piezoelectric or magnetic slides or any other method to accurately position the subdies in their proper locations. The ball cylinder 16 will provide feedback information regarding the position of the sub-dies 14 to the computer 20 through the cable interface 22. As an alternate the subdie position may be verified using variable voltage feedback sensors, rotory or linear encoders, glass scales, analog signal feedback, self-homing and self-zeroing switching routines, or pulse counting.

The sub-dies 14 also include a number of cammed punches 24, which are either manually or automatically selected by the control panel on the computer. The various types of cammed punches 24 add holes to the numerous parts that can be built by the computer controlled stamping die apparatus and system 12 dependent upon the customer requirements. Each cam 26 in the system is operated by a double acting air cylinder and solenoid 28 which are connected to a control panel through a cable interface. It should be noted that the variable punches may also be activated by use of electrically driven cams, single or double acting air cylinders, mechanical linkages, rotory cams, linear cams or slides. Activation may be by electric solenoids to control air flow or by using pneumatic or hydraulic logic switching. Each individual cam 26 also includes two proximity sensors 30 which verify the position of the cam 26 and relay this information back to the computer 20 via the cable interface 22. However, it must be noted that any number of proximity sensors 30 may be used to verify the position of the cam 26. Furthermore, various types of proximity sensors may be used to sense cam position however, micro switches or mechanical switches may also be used.

Hydraulic clamps 32 are used to clamp the movable sub-dies 14 and hold them in the necessary position to create the various parts. However, it should be noted that air, mechanical electro-mechanical, toggle, or any other type of clamp may be used, provided they have sufficient strength to hold the subdies in their proper locations during operation. The clamps 32 exert the necessary pressure on to gib rails 31 and along the sides of the subdies to maintain orientation, alignment, and die position during operation and the maintenance of the die press system. It should be noted that instead of using gib rails 31, ballslides, way slides, keys or any other guiding method may be used to maintain proper alignment of subdies 14. The hydraulic system is also controlled by the computer system via a pump and directional valve. It should be noted that the hydraulic clamping system may be disconnected from the control pump after the dies are clamped in position. This will maintain pressure for the purpose of die service or die maintenance to the press system. An alternative method to clamping the upper subdie 14 assemblies is using a sliding key or gib activated by hydraulic cylinder, electric solenoids, or pneumatics.

The computer controlled stamping apparatus 12 also includes within its die package an air lift system which reduces friction while moving the sub-dies 14 to their predetermined positions. In particular when the hydraulic clamps 32 are released from their clamped state, a controller energizes an air valve. The weight of the sub-die 14 opens a small poppet valve 40 under the particular die 14 thus creating a film of air on which the die rides during movement to its new or home position. As the sub-dies 14 move along the master die shoe or plate, they will ride over additional poppets 40 causing those poppets to open providing the air film upon which the sub-die 14 will move with reduced friction. Furthermore, other poppets 40 are released and closed automatically when the sub-die 14 moves off the top of them. Once the sub-die 14 reaches its new predetermined position, the controller will turn off the air valve which deactivates all of the poppets 40 which in turn lets the die 14 settle to its resting place in the press system. Instead of using poppets, the airlift system could use air bearings, lift rails with rollers or balls, or the like. Once the dies 14 have settled to their resting place the hydraulic clamps 32 are once again activated to clamp the sub-dies 14 into their new position such that a new part may begin its run.

The computer controlled die system 12 also includes an input system which allows the operator to select and enter preloaded product part numbers or to create new part numbers in the system. The input system preferably uses a touch screen for inputting values, however any other input device such as a keyboard, mouse, bar code scanner, magnetic card swiper, programmable cards such as in a PCMCIA interface, electronic or magnetically coded keys, or a series of switches that are manually activated could be utilized to operate the various systems. To add a new part to the system first a basic part number is selected and then various features such as notches, holes, length, etc are added to the basic part number to create the new part number. This information is then stored in the computer 20 for future use if such part has to be run at a later time. The input system will also allow for start up and shut down control by the operator for the press computer controlled system 12. The input system is preferably housed in a stand-alone control console on wheels. It should be noted that the console can also be permanently fixed to a floor or wall depending on the press operating environment. The control of the system is accomplished by using a Pentium 133 MHZ processor computer. However, it should be noted that any computer processor having enough speed to correctly operate the computer controlled apparatus may be used in the computer controlling the press system or that programmable logic controllers (PLC) may also be used depending on the complexity of the systems to be operated. The computer also has 64 MB RAM memory and a 850 MB hard drive along with battery backups. The computer also contains a 3.5" floppy drive, 2 COM ports, and one parallel port. It should be noted that the above are recommended specifications for the computer but other configurations may be used depending on the press operating environment or needs. It should be noted that the interface between the computer controller and the die systems is via at least one electric cable that deliver signals to the various motors, solenoids, valves, etc. and also transmit feedback and sensor data to the controller. Alternative interfaces could be by fiber optics, multiplex or network systems such as Device Net®, Infrared or radio (RF) transmission, or any other method capable of transmitting signals for the operation of the various systems utilized in the die.

The computer controlled die system 12 also includes a motion system which includes in the preferred embodiment at least one electric linear actuator 42 with an internal ball screw 16. The linear actuator 42 is driven by a stepper or a servo motor 18. There is an electrical linear actuator for each movable sub-die 14, the actuator 42 is interfaced to the computer 20 through the programmable controller. Each linear actuator cylinder also includes an internal sensor strip 46 for positional feedback through the programmable controller to the computer 20. In an alternate embodiment, this positional feedback could also be accomplished by the use of rotary encoders for each linear actuator cylinder 42.

The computer controlled die system 12 also includes a cam system which is used for individual selection of all necessary vent, notches and other punches to create the finished product. Each of the above mentioned punches are activated by an air driven cam 26. Furthermore, each cam is located near a proximity sensor to alert the computer and then the operator of a malfunction such as a cam 26 not engaging the punch correctly, etc. The sensor 30 also feeds back to the computer information regarding the position of each punch and that it is properly deployed. The cam system in the event of a malfunction will send a signal via the cable interface to the computer system 20 such that the touch screen or other input device will graphically display the number and position of the punch that has experienced the malfunction. Then the operator can take the necessary action to repair the problem or bypass the system if necessary.

The computer controlled die system 12 also includes a clamping system which is primarily contained within the main die and includes the following components, the clamps 32, hydraulic lines 48, accumulator module 50, filter module 52, pressure switch 64, sequence valve 54, needle valve 56 and quick disconnect 58. The main pump, directional valve and additional pressure switch 64 are all combined into a self standing unit 65. The pressure switch 64 is connected through the die misfeed system so the press and all other systems will shutdown in the event of a loss of pressure in the hydraulic system.

The main controller unit which is a NEMA rated console contains a computer 20, programmable controllers, input/output boards for all of the sensors, air solenoids and valves and all necessary interfacing devices for the numerous subsystems of the computer controlled die press system. Operation of the controller is locked out during operation of the press through the die and press misfeed system. The controller is only operated when the press is stopped at top dead center. Furthermore, the press cannot be started until the controller is finished with its setup and test sequences. Any failure of any sub-system causes the press to stop automatically which prevents damage to the die and subsystems. The computer controlled die system 12 reduces change over from part to part to as little as 15 seconds up to five minutes depending on the scope of the change from each part being stamped. The main computer controller also includes special accessible diagnostic screens for maintenance and/or troubleshooting purposes for the computer controlled die system. This system is activated by password protection or a key switch on the outside of the controller unit.

In operation the process to control the computer controlled die is as follows. First the power to the system is powered up. Next the controller verifies that the press is at top-dead-center position. The operator then selects the proper screen for use to input the data from the required menus. Next the operator inputs the part number or creates a new part number using the available sequential steps in the program. Next the computer 20 would select the proper program and activate the sub-systems in the following order. First, the controller would activate and deactivate various cammed punches 24 as required by the inputted part number or new part data. Next the proximity sensors 30 would verify the proper cam positions have been achieved and are set for the pressing operation. Next the hydraulic clamps 32 are deactivated, then the airlift poppets 40 are activated. Next the motion system is engaged which allows the sub-dies 14 to float on a film of air to their proper locations for the inputted part number. Then sensors 46 will verify the position of the sub-dies 14 and feedback such information to the controller. Next the motion system is disengaged and the airlift systems are deactivated. Once the sub-dies 14 have been allowed to settle, the hydraulic clamps 32 are re-pressurized to a force necessary to engage the sub-dies 14 such that they do not move during pressing operations. Next the controller verifies that all of the subsystems are set and placed for the required stamping operation and are in an operational state. Next the press lockout is terminated or turned off and a ready signal light is switched on. Finally, the operator starts the press and the parts are stamped according to the inputted part number or new part data numbers. The press is run for the number of parts needed then the sequential operation or process may be repeated to change the locations of the cams and subdies for a new part to be run.

The present invention has been described in an illustrative manner. It is to be understood that the terminology which has been used is intended to be in a nature of words of description rather than of limitation.

Any modifications and variations of the present invention are possible in light of the above teachings. Therefore, within the scope of the appended claims, the present invention may be practiced otherwise than as specifically described.

What is claimed is:

1. A computer controlled die apparatus, said apparatus including:

a master die shoe;

a plurality of sub dies located within and moveable with respect to said master die shoe;

an input system, said input system having a computer, said computer electronically connected to the apparatus;

a detection system and monitoring system located adjacent to said sub dies;

a motion system, said motion system includes an electric linear actuator having an internal ball screw mechanically connected to a motor for each moveable sub die;

an air driven cam system located near an outside surface of said sub dies;

a clamping system positioned near a surface of said sub dies; and an airlift system located on a surface of said master die shoe, said airlift system including an air valve, said air valve is connected to a plurality of poppet valves, said poppet valves provide a layer of air upon which said sub-dies move in said master die shoe.

2. The computer controlled apparatus of claim 1, wherein said linear actuator is interfaced by at least one cable to a computer.

3. The computer controlled apparatus of claim 2, wherein said linear actuator includes an internal sensor strip connected to said computer.

4. The computer controlled apparatus of claim 2, wherein said linear actuator includes rotary encoders.

5. The computer controlled apparatus of claim 2, wherein said cam system includes a plurality of cammed punches, said punches are individually activated by an air device.

6. The computer apparatus of claim 5, wherein said each individual cam being located near at least two proximity sensors, said proximity sensors connected to the computer.

7. The computer controlled apparatus of claim 1, wherein said clamping system includes clamps, hydraulic lines, an accumulator module, a filter module, a pressure switch, a sequence valve, gib rails, a needle valve, and a quick disconnect.

8. The computer controlled apparatus of claim 7, wherein said clamping system further includes a self standing unit having a main pump, a directional valve, and a pressure switch.

9. The computer controlled apparatus of claim 1, wherein said poppet valve is opened by weight of said sub-die.

10. The computer controlled apparatus of claim 1, wherein a predetermined number of sub-dies are movable.

11. A computer controlled apparatus for making variable design stampings, said apparatus includes:

a master die shoe;

a plurality of sub-dies located on a surface of said master die shoe, a predetermined number of said sub-dies are movable in said master die shoe;

an electric linear actuator connected to said moveable sub die, said actuator interfaced electronically to a computer;

a plurality of cammed punches located in an upper die shoe, said punches being individually activated by an air device, each individual cam having at least two proximity sensors located near each said cam;

a plurality of clamps, said clamps secure said master die shoe and said upper die shoe in a proper predetermined stamping position; and an air valve connected to said apparatus, said air valve connected to a plurality of air poppet valves, said air poppet valves provide a layer of air upon which said plurality of sub-dies ride in said master die shoe.

12. The computer controlled apparatus of claim 11 wherein said actuator has an internal ball screw mechanically connected to a motor.

13. The computer controlled apparatus of claim 12 wherein said actuator includes a sensor strip.

14. The computer controlled apparatus of claim 11 wherein said clamps are connected to hydraulic lines, an accumulator module, a filter module, a pressure switch, a sequence valve, a needle valve, and a quick disconnect.

15. The computer controlled apparatus of claim 11 further including a self standing unit having a main pump connected to said clamp, a directional valve and a pressure switch each located between said main pump and said clamps.

16. The computer controlled apparatus of claim 11 wherein said poppet valves open by weight of sub dies.

17. The computer controlled apparatus of claim 11 wherein said apparatus is automatically changed for a new part.

18. A computer aided die control method, said method including the steps of:

powering a computer system on;

verifying press is at a top dead center position;

selecting a computer screen for input of data;

inputting data relating to a part to be stamped;

selecting proper control program stored in the computer;

activating cammed punches as required by said part;

verifying cams are in proper position via at least two proximity sensors for each individual cam;

deactivating hydraulic clamps;

activating air lift poppets;

engaging a motion system that moves sub-dies on a film of air to predetermined locations;

disengaging said motion system;

deactivating said air lift system;

pressurizing said hydraulic clamps; and verifying all subsystems are set and in an operational mode.

19. The computer aided die control method of claim 18 including the step of inputting a part number.

20. The computer aided die control method of claim 18 including the step of creating a new part number.

21. The computer aided die control method of claim 18 including the step of starting the press operation.

22. The computer aided die control method of claim 18 including the step of terminating press lockout.

23. The computer controlled apparatus of claim 1 wherein said sub-dies having a range of movement within a plane of said master die shoe between approximately 1.5 to 6.007 inches.

* * * * *